United States Patent
Corbin (12)

(10) Patent No.: US 6,295,542 B1
(45) Date of Patent: Sep. 25, 2001

(54) METHOD AND APPARATUS FOR CROSS-REFERENCING TEXT

(75) Inventor: Robert George Corbin, Chippenham (GB)

(73) Assignee: National Power PLC (GB)

( * ) Notice: Subject to any disclaimer, the term of this patent is extended or adjusted under 35 U.S.C. 154(b) by 0 days.

(21) Appl. No.: 09/165,081

(22) Filed: Oct. 2, 1998

(51) Int. Cl.[7] ........................................ G06F 17/21
(52) U.S. Cl. ........................................ 707/501.1; 707/530
(58) Field of Search ............................. 707/501.1, 500, 707/513, 530

(56) References Cited

U.S. PATENT DOCUMENTS

| | | | |
|---|---|---|---|
| 5,644,776 | * 7/1997 | DeRose et al. | 707/500 |
| 5,708,825 | * 1/1998 | Sotomayor | 707/501 |
| 5,794,257 | * 8/1998 | Liu et al. | 707/501 |
| 6,014,678 | * 1/2000 | Inoue et al. | 707/501 |
| 6,055,522 | * 4/2000 | Krishna et al. | 705/517 |

OTHER PUBLICATIONS

"Using NLP to Check Contract Documentation", Robert G. Corbin, Published in the conference proceedings, organized by Unicom Seminars Limited, Mar. 18, 1997, London, UK.

"Multimedia Hyperlinks Automatically Created for Reference Documents," Research Disclosure Jun. 1993, p. 368.

XGL Hypertext Voyager Version 1.0 User's Guide, 1995.

* cited by examiner

Primary Examiner—Stephen S. Hong
(74) Attorney, Agent, or Firm—Haynes and Boone, LLP

(57) ABSTRACT

A method and apparatus for the automatic insertion of hypertext links into a passage or document of encoded text is disclosed. A program, resident on a personal computer, for example, receives and parses input text in HTML format. In a first part of the processing, label strings identifying each paragraph number are located in the read in document. These are converted into an unambiguous format. Next, the text is re-read, with the paragraphs/section headers masked off, to locate text strings within the body of the text which cross-reference the section headers, or term definitions, or external links. These are also placed in an unambiguous format. Finally, the cross-references are matched up as far as possible with section/paragraph headers and the original HTML text is marked up automatically with hyperlinks, using the unambiguous section labels and cross-references as HTML anchors and destinations.

26 Claims, 4 Drawing Sheets

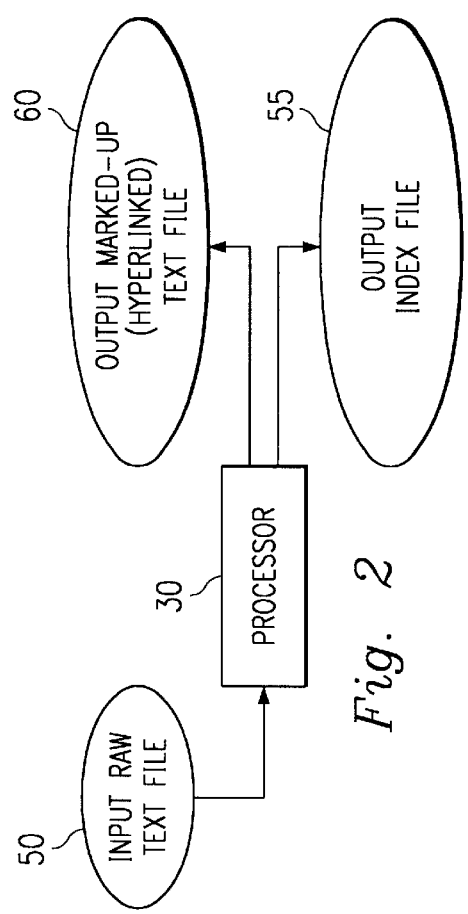
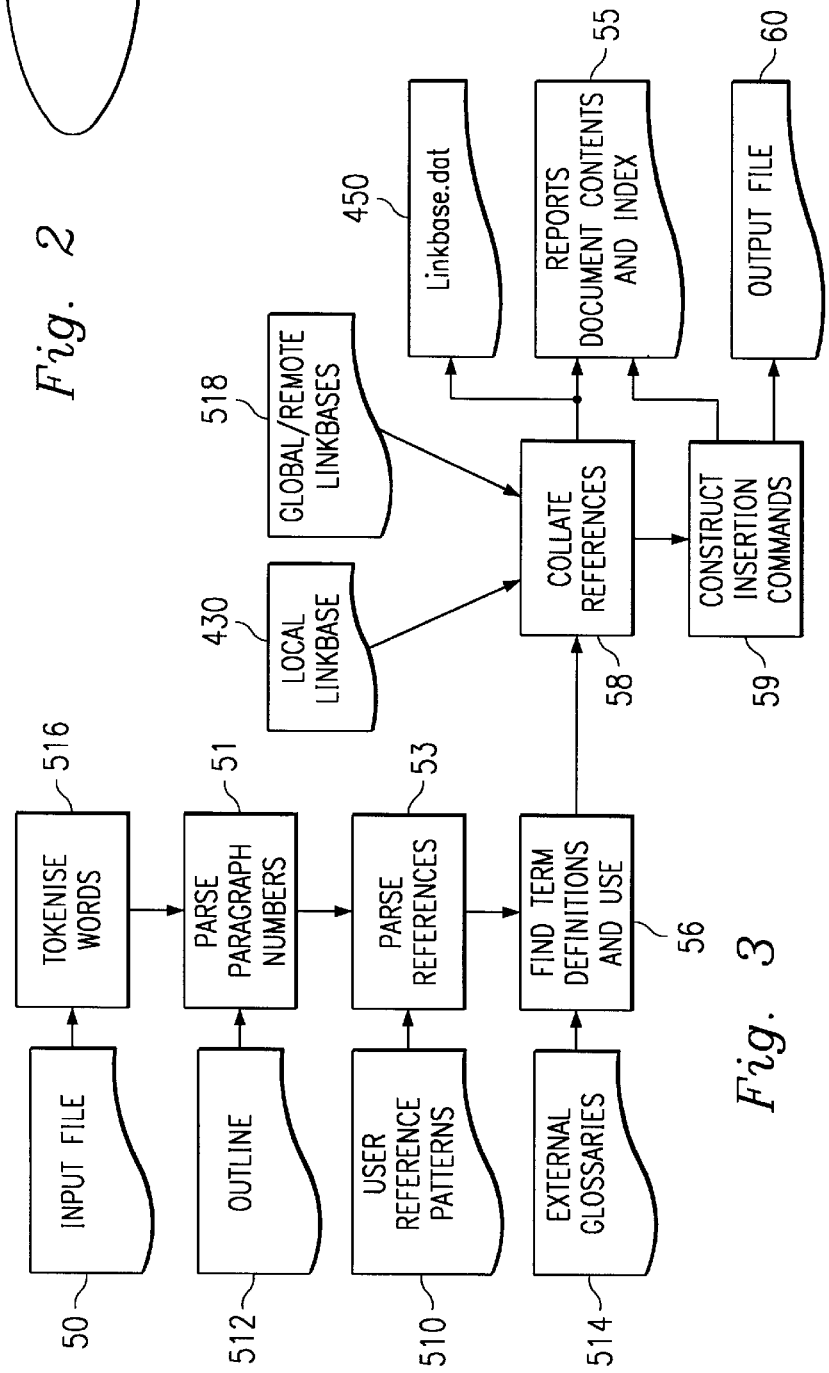

METHOD AND APPARATUS FOR CROSS-REFERENCING TEXT

FIELD OF THE INVENTION

This invention relates to a method and apparatus for cross-referencing text, and particularly, but not exclusively, to a computer program for automatically inserting hypertext links into legal documents, for example.

BACKGROUND OF THE INVENTION

Many forms of legal document such as joint venture agreements, construction contracts, licences or materials supply agreements are created by companies in the conduct of their business. For example, The Pooling and Settlement Agreement for England and Wales which governs the trading of electricity has over 7000 clauses, 5900 cross-references, and 2000 definitions.

Frequently the documents may be interrelated, such as those which deal with different aspects of a new power station project, for example: joint venture, power purchase, fuels supply, construction, and operation and maintenance agreements for which consistency in the usage of defined terms, dates, liabilities and so forth across the agreements is important.

It is a huge task to prepare and check all the documentation, often involving many people. Usually, there is time pressure in the preparation of the documents especially during negotiations. The documents may need to be redrafted many times to accommodate the changes, any of which may lead to errors.

Only now are systems coming to market which are starting to help contract draughtsman. Although word processors have been in use for quite a few years, the level of machine checking has been limited to the use of a "spell checker", and "document comparison" to mark changes between different versions.

With the advent of the Internet and the worldwide web, the availability and popularity of a formatting language called HTML has increased dramatically. Many current commercially available programs, such as Word Processing and Internet Browser Software sold by Microsoft®, can generate and read HTML.

HTML is an acronym of Hypertext Mark-up Language and is a particular form of a general mark-up language. The HTML language employs a series of standardized codes inserted into unformatted (typically ASCII) text. These codes, being standardized, can be read and understood by a wide variety of programs, operating on many different platforms. The text may thus be displayed in a formatted manner according to the codes embedded within the text.

One particular feature of HTML is the ability to create and view multi-dimensional electronic documents, which may be entered at many points and which may be browsed in any order by interactively choosing words or by phrases as search parameters for the next text or image to be viewed.

The words or key phrases which permit the user to jump quickly and easily to related text in other documents (or indeed within the document itself) are known as "hypertext links "or "hyperlinks". As with the formatting of the text itself, these hyperlinks are inserted using HTML mark-up tags.

Legal documents are naturally very rich in cross-references which can be made into hypertext links.

As will be familiar to those skilled in the art, hyperlinks are created in HTML by "tagging" chosen words or phrases with code. This code, which is of course hidden (i.e., not shown in the displayed text), defines the address of, for example, a document held on another server elsewhere, or that of a document held in the same directory as the current document, or even another position within the same document. In the latter case, the code associated with the displayed text forming the hypertext link is given a name by the user. When the hypertext link is activated (usually by clicking a mouse button), the programme reading and displaying the HTML code searches for a marker elsewhere within the document, the marker being the name given by the user to the hypertext link.

All current commercial authoring tools for creating documents with hyperlinks require the author to insert the links by hand. For contracts with many hundreds of possible links it is impractical to undertake this task manually.

Prior work on the automatic creation of hypertext links in hypermedia has been concerned with creating links between concepts contained in different documents. The problem has then been to analyse each document to find the key words or phrases which describe what the document is about, then to find similar documents for linking to.

As with, for example, speech recognition, sophisticated artificial intelligence is required to allow a program to understand ambiguous words or phrases in context and thereby correctly insert links. Currently, progress in this field is slow and is largely academic.

Anonymous Research Disclosure No. 350009, published Oct. 6, 1993, discloses a technique for creating automatic hyperlinks for reference documents. The hypertext generation program is written to read a referenced document and convert as many of its footnotes and bibliography references to multimedia link markers as possible. The program expects the footnote and bibliographical format used to be input along with the name of the document to be converted to multimedia hyperlinks. The program scans the document looking for footnote references or bibliographical references.

When a reference is found, a search is commenced with the reference passed on to a multimedia library system. If the library system finds the reference, it passes back the information to a hypertext generation program. The program then saves the information that allows the reference to be later hyperlinked. In addition, the conversion program saves information that allows the reference (footnote marker, bibliographical description) to be highlighted so as to indicate to a researcher (user, reader, etc.) that the reference is activated and available for immediate linking.

It is an object of the present invention to provide an improved technique for insertion of automatic hypertext links.

SUMMARY OF THE INVENTION

In a first aspect, the present invention accordingly contemplates a software program for cross-referencing text within a document, the program carrying out the steps of:

(a) locating label strings within said document, each label string labelling an associated part of said document;

(b) converting each said located label string into standard format such that the said associated parts of said document are each unambiguously labelled by said standard format;

(c) locating cross-reference strings within said document, said cross-reference strings referring to parts of said document labelled by said label strings;

(d) converting each said cross-reference string into said standard format such that said converted cross-reference strings refer unambiguously to one or more labelled parts of said document;

(e) collating said standard format cross-reference strings with said standard format label strings; and (f) providing a program link between said cross-reference strings and those labelled parts of said document to which they refer.

The conversion of label strings into a standard format allows previously ambiguous label strings, such as section headers for example, to be uniquely identified. By also converting cross-references into a standard form, labels and cross-reference strings may be matched up with one another so that hypertext links between the two, for example, may be created automatically. To mark up a lengthy document with hyperlinks manually can take many man hours, and the time saving provided by the present invention is significant.

The program preferably locates the label strings and cross-reference strings by parsing the input document into constituent character groups using a predefined set of rules. Specific character strings are sought for locating particular types of label strings, for example paragraph headers, which can act as hypertext link anchors. These are recognized by seeking patterns of characters that comply with predefined rules.

According to a second aspect of the present invention, there is provided a software program for cross-referencing text within a plurality of documents, the program carrying out the steps of:

(a) locating label strings within each said document, each label string labelling an associated part of each said document;

(b) converting each said located label string into standard format such that the said associated parts of each said document are all unambiguously labelled by said standard format;

(c) locating cross-reference strings within said documents, said cross-reference strings referring to parts of said documents labelled by said label strings;

(d) converting each said cross-reference string into said standard format such that said converted cross-reference strings refer unambiguously to one or more labelled parts of said documents;

(e) collating said standard format cross-reference strings with said standard format label strings; and (f) providing a program link between said cross-reference strings and those labelled parts of each said document to which they refer, whereby a cross-reference string may be linked to a label string within a same one of the plurality of documents or to a label string within another of the plurality of documents.

The invention also extends to an apparatus for cross-referencing text within a document, said apparatus comprising a computer having:

(a) means for locating label strings within said document, each label string labelling an associated part of said document;

(b) means for converting each said located label string into standard format such that the said associated parts of said document are each unambiguously labelled by said standard format;

(c) means for locating cross-reference strings within said document, said cross-reference strings referring to parts of said document labelled by said label strings;

(d) means for converting each said cross-reference string into said standard format such that said converted cross-reference strings refer unambiguously to one or more labelled parts of said document;

(e) means for collating said standard format cross-reference strings with said standard format label strings; and (f) means for providing a program link between said cross-reference strings and those labelled parts of said document to which they refer.

Further objects and advantages are set out in the following description of a preferred embodiment, which is provided for the purpose of illustration only and is not to be considered limiting in nature, and by reference to the accompanying drawings.

BRIEF DESCRIPTION OF THE DRAWINGS

FIG. 2 shows the data structure received and output by the processor in the computer of FIG. 1.

FIG. 3 shows a top level flow diagram of a data processing methodology which embodies the present invention.

DETAILED DESCRIPTION OF A PREFERRED EMBODIMENT

A contract will consist of a set of clauses, sections, paragraphs etc. together with attachments such as appendices, schedules, annexes, attachments or exhibits. At least some of these may be external to the document itself; for example, some of the schedules may refer to Statutes which are available across the Internet.

As previously explained, hypertext links have previously typically been inserted manually, by identifying and labelling parts of a document and then linking them to another part thereof by using that label as a marker. It is necessary that each part, paragraph, schedule and so forth in the text be labelled or marked with a unique unambiguous marker, (called an "anchor") if subsequent cross referencing and hyperlinking is to be correct.

Figure 1:
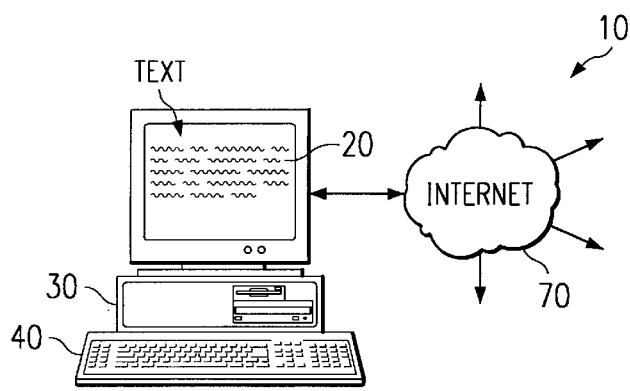
FIG. 1 shows a schematic diagram of a personal computer and network environment.

The algorithm described herein seeks to automate this laborious procedure. Referring first to FIGS. 1 and 2, a schematic diagram of a personal computer 10 is shown. The personal computer has a screen 20, a central processing unit 30, and a keyboard 40, as will be well known to those of ordinary skill. The processor 30 is loaded with a program whose function is to be described, so that the processor acts as a processing engine. It is understood that multiple computers 10 embodying features of the present invention may communicate with each other via the internet 70 or via another computer network communication system.

A file 50 in HTML format, for example, is received by the processing engine. This input file 50 is typically a contract containing various clauses and so forth which it is desired to cross-reference internally, and externally, using hypertext links.

The processing engine parses the text of the input file 50. A unique "Name" or destination anchor for each clause is defined so that the cross-reference parser can generate the appropriate source link to it. Terms, tables and figures are likewise identified.

FIG. 3 shows an overview of the text processing in the preferred embodiment of the present invention. Text processing is divided into eight main stages:

I Reading the input file 50;

II Recognition of the section numbers 51;

III Generation of destination anchors for each recognized section;

IV Recognition of cross-references 53;

V Generation of standard form cross-references from reference patterns.

VI Recognition of "defined terms" and the creation of description anchors for them 55;

VII Collation of references with paragraph numbers 58; and

VIII Insertion of link tags 59.

The input file 50 is processed a paragraph at a time with two passes through the input file 50. The first pass collects the information. The second pass creates the final output file or files. Between the two passes the links are collated.

I—Reading the Input File

Still referring to the flow chart of FIG. 3, the process for reading the input file 50 is described. The input HTML file = is read a character at a time until a character string (a WORD, see below) has been found. The HTML comment <!--++start--> if present, marks the start of processing. This can be used after a contents list in an input file to prevent false recognition of index entries as section numbers.

If not present, processing starts at the first line of the input file after the HTML "<BODY..>" tag.

An HTML tag <!--++skip--> marks the start of text not to be processed. The <!--++/skip--> tag marks the end of the text so marked.

In the text, each character is allocated to one of eleven different main classes. The program moves along the text, and the first character found defines the start of a WORD. Processing continues with each character being read in turn. A new WORD is deemed to have started when the character being read belongs to a different class to the character previously read.

A WORD is defined as (1) TEXT; (2) NUM; (3) SPACE; (4) PUNC; (5) HTML; (6) TAB; (7) QUOTE; (8) CONJ; (9) NAV; (10) EMPTY; and (11) DEL. These in turn are defined below.

(1) A "TEXT" WORD is defined as any alphabetic character.
(2) "NUM" is defined as a number.
(3) "SPACE" WORD is defined as a white space character.
(4) A "PUNC" WORD is defined as any style punctuation character.
(5) An "HTML" WORD is defined as any sequence of characters defining a hypertext mark up language code sequence;
(6) "TAB" is the tab character (ASCII code number 9).
(7) "QUOTE" is a quotation mark.
(8) "CONJ" defines the ampersand character (&).
(9) "NAV" defines any character forming part of a program directive.
(10) "EMPTY" indicates that a word is to be ignored during parsing, and
(11) "DEL" refers to a word which is not to be included in the output stream.

The word object is tagged with its type, together with its start and end character position relative to the start of a paragraph. This allows subsequent insertion of hyperlinks at the correct location. Word objects will be reclassified later dependent upon the processing being undertaken.

Words are read in until an "end of paragraph" object is encountered. An end of paragraph is any of the HTML words:

<P>
</P>
<HR>
<TR>
</TABLE>
<BODY>
</BODY>
</HEAD>
<LI>
</LI>
</UL>
</OL>
<PRE>
</PRE>
</BLOCKQUOTE>
</ADDRESS>
<DL>
</DL>
</DL>
</DIR>
</MENU>

A paragraph is an array of word objects. It is assumed that the section number, any cross-references or definitions do not span across more than one paragraph.

II—Recognition of Section Numbers

Figure 4:
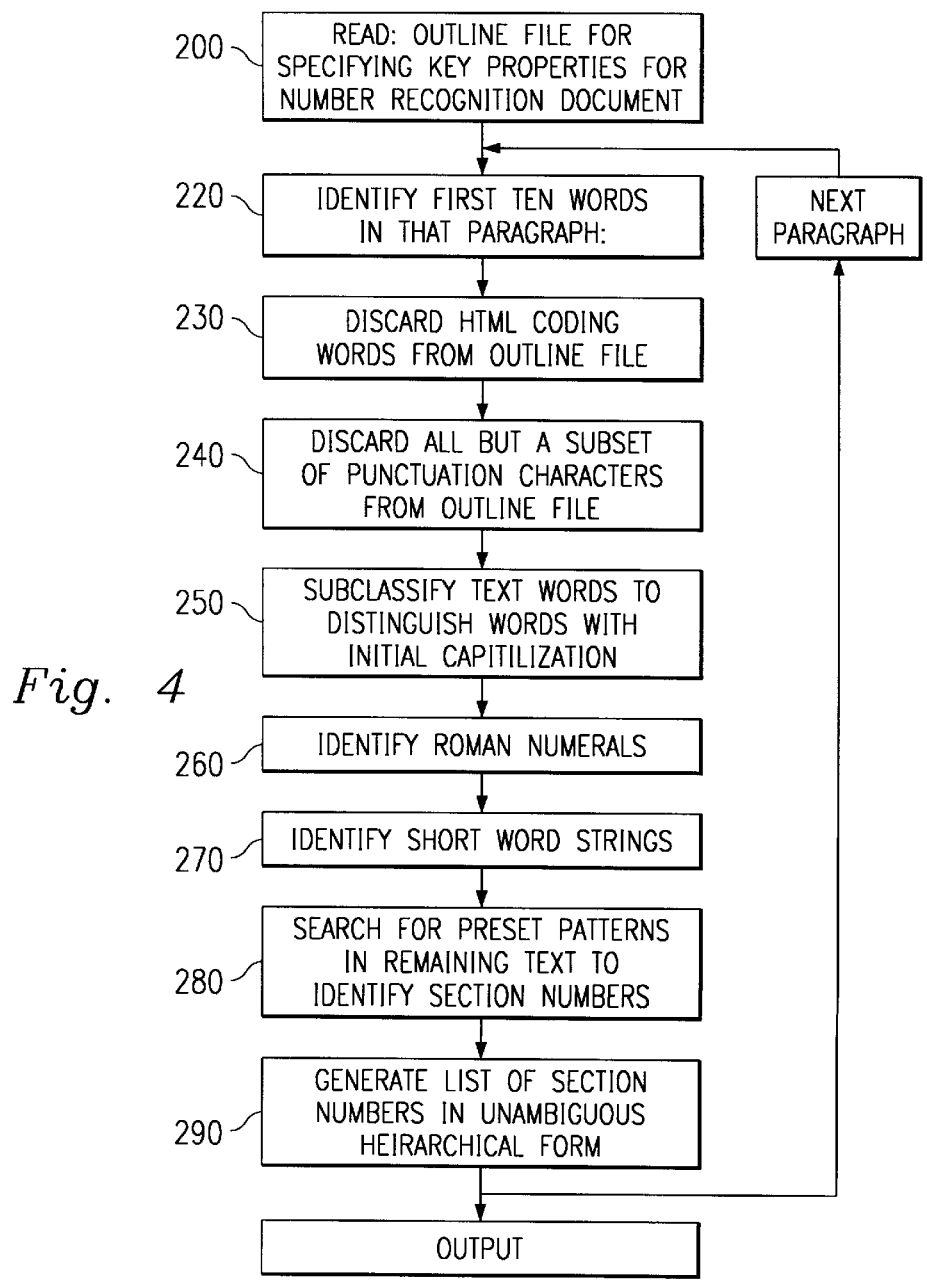
FIG. 4 shows a flow diagram of a first part of the data processing method of FIG. 3.

Following parsing of the HTML file into its constituent words, using the rules outlined above, and simultaneous identification of paragraphs, it is necessary to recognize section numbers in the text. This is explained with reference to FIG. 4. The section numbers are identified from words at the start of a paragraph. A selection of candidate words from the beginning of a paragraph is made. These are then processed, using the previous section number and an outline file, to form a new recognized section number (referred to as a "head level").

The outline file is created by the program user and is readable by the program itself (step 200). The outline file acts as a section labelling template (that is, a set of global rules for section number identification within the document) and is used to resolve ambiguity in section numbering and in collating references with section numbers. The outline file also specifies program directives which control the action of the program. A typical outline file might look like this:

Outline File switch=fs section schedule.paragraph.subparagraph schedule.appendix.paragraph. subparagraph schedule.part.paragraph.subparagraph.

where the command "switch=" is a program directive.

Here, the program is instructed to output a new outline file for each section in the input file, ("!f") and to treat references to schedules as references to external documents ("!s") (step 210).

The section numbering recognition algorithm will now be described. As an initial stage, the paragraph is truncated so that only the first ten words of a given paragraph in the input file are read (step 220). As described above, the words parsed by the program engine consist of eleven generic types—TEXT, NUM, SPACE, PUNC, HTML, TAB, QUOTE, CONJ, NAV, EMPTY, and DEL. Any words falling into the HTML category are discarded (step 230), as are those words identified as a SPACE a program directive (NAV), EMPTY and DEL words, and CONJ, as these words are deemed never to identify a section heading or a part thereof. This leaves just TEXT, NUM, PUNC, TAB and QUOTE.

The PUNCTUATION words are further filtered to discard all characters except brackets "(" or ")", backslash "/", equals "=" and a colon ":" (step 240). For the purposes of section number recognition, the program does not distinguish between left or right brackets. The TEXT words are reclassified to distinguish those words with initial capitalization (e.g. "Section"), which are labelled CTEXT (step 250). Further reclassification of TEXT words includes distinguishing roman numerals (labelled RN), at step 260, and short ALPHA strings (SA) (step 270). For example, "Section 6(a)(i)" contains a CTEXT, then a NUM, then a PUNC, then an SA, further PUNC (twice), an RN and PUNC. The program also filters TEXT into RN only when the character is an "in", "x" or "v", and into SA only when the character is alphabetic, two different juxtaposed alphabetic characters, or an alphabetic string with all characters the same.

To recognize a section number (containing a NUM RN or SA as previously defined), the program searches, at step 280, for a list of patterns (see Table 1) for the first pattern which matches the sequence of words at the start of a paragraph. These patterns also define when a NUM should not be treated as a section number.

TABLE 1

| Input Pattern | Result |
| --- | --- |
| NUM/ | ignore |
| KEY NUM TEXT | ignore |
| NUM TAB= | ignore |
| NUM TEXT) | ignore |
| QTE NUM QTE TAB | ignore |
| NUM NUM TAB= | ignore |
| KEY NUM NUM TEXT | ignore |
| NUM TAB TEXT TAB | ignore |
| QTE NUM NUM QTE TAB | ignore |
| KEY NUM : CTEXT | Section number |
| KEY NUM NUM | Section number |
| LEY NUM CTEXT | Section number |
| KEY NUM | Section number |
| NUM) TAB NUM) TAB | Section number |
| NUM) NUM) QTE TEXT | Section number |
| NUM TAB TAB NUM) TAB | Section number |
| NUM TAB NUM) TAB | Section number |
| NUM) NUM) TEXT | Section number |
| NUM) NUM) CTEXT | Section number |
| NUM) NUM) TAB | Section number |
| NUM NUM NUM TAB | Section number |
| NUM TAB NUM TAB | Section number |
| NUM NUM) CTEXT | Section number |
| NUM NUM) TAB | Section number |
| NUM TAB TAB CTEXT | Section number |
| NUM NUM TAB | Section number |
| NUM TAB | Section number |
| NUM CTEXT | Section number |

(Note NUM is either of NUM, SA or RN defined above)

Two further rules are applied. An RN is classified as an SA if it is next in the alphabetic sequence from the last recognized section number. This prevents incorrect recognition of, for example "Section 6(i)" as "Section 6, Roman 1" if the previous section number was "Section 6(h)". Similarly, an SA is classified as an RN if the previously identified section number was an RN. This prevents, for example, "Section 6(v)" being recognized as "Section 6 letter v" when the previously identified section number was "Section 6(iv)".

Sequences of NUM, SA or RN are extracted from the paragraph following the above rules and concatenated together with a decimal point separator, as will be explained below. For example, the text in a paragraph might read "see sub-section 6.2(c)". Often, that subsection will itself be labelled only with the letter 'c)' at its beginning. The anchor number assigned to it must distinguish between a 'c)' in this section and in some other section or appendix.

To do this, a document hierarchy is defined, similar to that specified in the outline file:

document.section.sub-section.sub-sub-section . . .

document.appendix.section.sub-section . . .

document.appendix.annex.section . . .

and so on.

Each level is expressed in its full form (step 290). In this example section 6.2(c) will be:

6.2.c where 6 is the section, 2 the sub-section and c is the sub-sub-section.

Note that from the example it is rare to get a direct correspondence between sub-sub-section 6.2.c and the words used "sub-section". Often the words section and paragraph are used interchangeably and this can lead to ambiguity when referring to paragraphs in an appendix and sections in the main part of the document. Local cross-referencing in an appendix (or other forms of attachment) usually does not include the name of the attachment.

III—Generation of Anchor Labels for Each Section

Based upon the above rules, the program starts at the beginning of the HTML file (or at the <!--++start--> comment), and generates a list of paragraph numbers in the above form. Passages marked not to be processed are skipped.

An example of the section numbers seen towards the end of a document, and the standardized format they are placed into after recognition, is shown in Table 2. Here, the left-hand column contains the section numbers as seen by a user, and the right-hand column contains the encoded section number anchor labels:

TABLE 2

| Section No. as actually labelled in document | Anchor label generated by program |
| --- | --- |
| Section 6 | 6 |
| 6.1 | 6.1 |
| a) | 6.1.a |

TABLE 2-continued

| Section No. as actually labelled in document | Anchor label generated by program |
|---|---|
| b | 6.1.b |
| (i) | 6.1.b.i |
| (ii) | 6.1.b.ii |
| 6.2 | 6.2 |
| 6.3(a) | 6.3.a |
| 7 | 7 |
| Schedule A | SchA |
| 1.1 | SchA.1.1 |
| a) | SchA.1.1.a |
| Annex I | SchA.AnxI |

In addition to generating a database of the Section numbers together with their full anchor labels, the corresponding first line of text may also be stored. This can then be used to generate an automatic index if desired.

IV—Recognition of Cross-References

Figure 5:
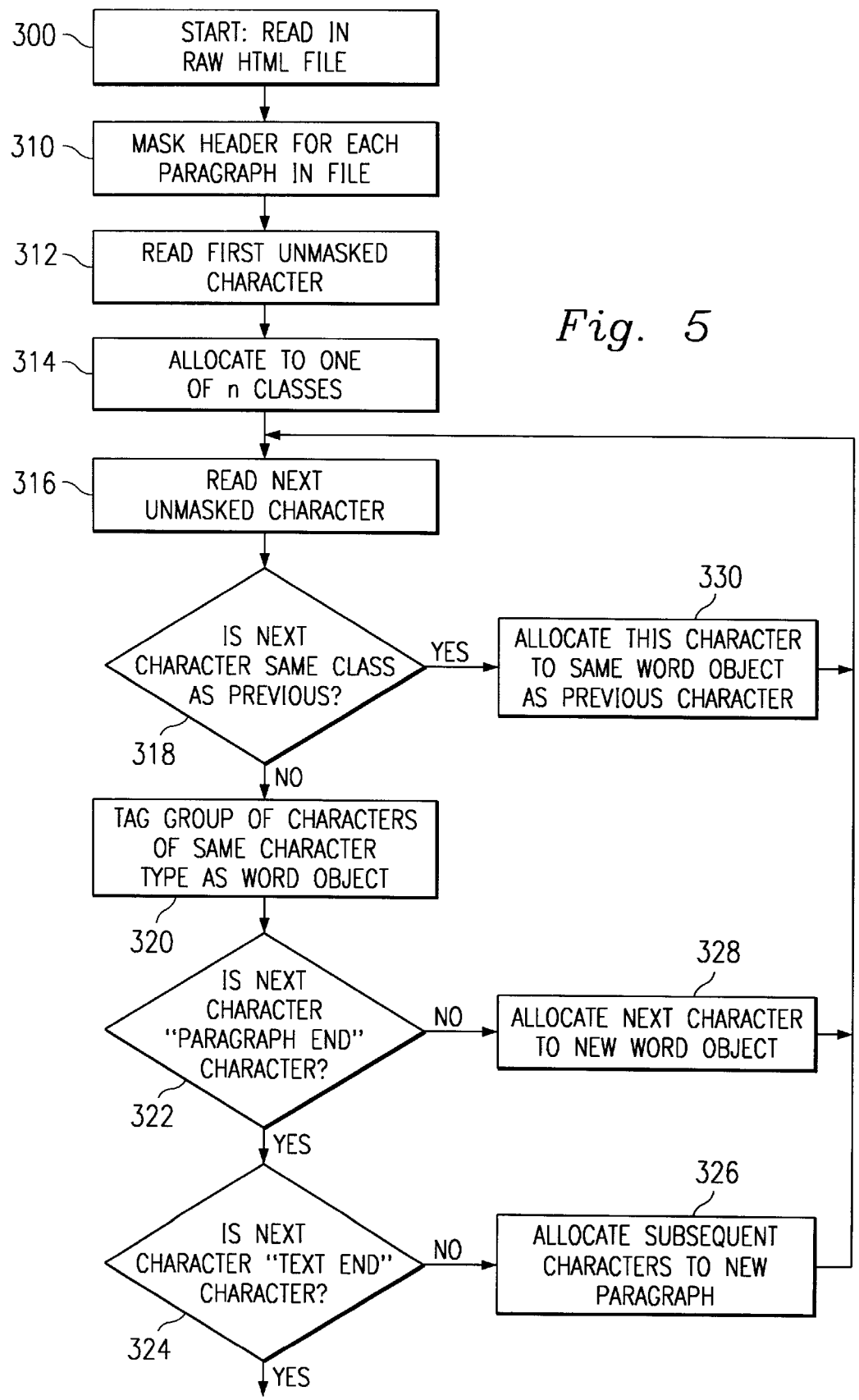
FIG. 5 shows a flow diagram of a second part of the data processing method of FIG. 3.

Once the program has identified and generated anchor labels for the paragraph headings, it must then process the full text to mark cross-references within the body of the text with these anchor labels, so that hyperlinks may be created. This procedure will now be described with reference to steps 300–330 of FIG. 5. It will be understood that truncating the paragraph for the purposes of locating section headings reduces the risk of cross-references in the body of the text accidentally being processed as part of a header. To prevent double processing, words identified as part of a header are reclassified (i.e., ring fenced) at step 310 so that the algorithm does not attempt to identify words already identified as parts of a header as cross-references as well.

The input paragraph from the HTML input file (at step 300) is read in and parsed using the same technique as in the identification of section numbering (described in I above). The read in file is filtered to remove all HTML code. Only TEXT, NUM and PUNC are left after filtering.

TEXT is then reclassified (as with the headings as described above). In addition to identifying roman and short alpha words, word patterns are sought to help identify where in the text cross-references may be found.

The program looks in particular for key words ("KEY"), CONJUNCTIONs (cf CONJ, which defines the "&" character), PREPOSITIONs. These are defined as:

KEY: "clause", "paragraph", "section", "article", "schedule", "appendix", "annex", "table", "note", "part", "chapter", "sub-section", "subparagraph", "subclause", "exhibit", "directive", "condition", "attachment".

CONJUNCTION: "and", "or"

PREPOSITION: "of", "the", "to".

The words "Act" or "Rules" are special cases. When these are located, all Capitalized words, CONJUNCTIONs and PREPOSITIONs, as well as words in parentheses, that precede the words "Act" or "Rules" are included. In the following, therefore, ACT is defined accordingly.

The program also records the different numbering styles. NUMBER is defined by (1) all digits (e.g. 12.5)

(2) lower case short alpha length 1 (SWL1): (e.g. a)

(3) lower case short alpha length 2 (SWL2): (e.g. aa)

NUMBER:

(4) roman lower case short alpha length 1 (SWV1): (e.g. B)

(5) upper case short alpha length 2 (SWV2): (e.g. BB)

(6) roman lower case (ROMAN L): e.g. vii)

(7) roman upper case (ROMAN V): e.g. (XI).

In addition to identification of internal cross-references, the program must also identify, separately, external references. These are labelled differently using the EXT tag. To do this correctly, PREPOSITIONs must be further parsed into "of", "to" and "the" respectively. The following rules are applied:

(d) a REF (either defined in (a) above or otherwise pre-tagged), followed by a PREPOSITION, followed by CTEXT (a word having initial capitalization as explained above). The PREPOSITION is further parsed into "of", "to" and "the". An EXT is only found if either "of" or "to" is present, and is followed by "the". For example:

"Section 4(a) of the Housing Act".

(e) an EXT (either defined by (d) above or when an EXT has already been found and tagged) followed by a CTEXT, a NUMBER or a KEY.

(f) an EXT (again either defined by (d) above or a previously determined and tagged EXT followed by a CONJUNCTION, followed by a PREPOSITION (specifically, "of" then "the") followed by another PREPOSITION (specifically, "the") followed by CTEXT.

(g) an EXT followed by a PREPOSITION (specifically, "of"), followed by a NUMBER, then CTEXT.

Having applied the above rules to identify strips, the start of a reference is identified as any word tagged as type KEY. The end of a continuous sequence of tagged words following the KEY word is identified using a finite state machine whose state transition rules are defined in Table 2.

TABLE 3

| CURRENT STATE | NEXT STATE |
|---|---|
| 0-KEY | 1-NUM;2-'(' |
| 1-NUM | 0-KEY;1-NUM;2-'(';3-')';4-OF;5-CONJ;10-to;6-',' |
| 2-'(' | 1-NUM;13-TEXT;13-CTEXT;13-inclusive |
| 3-')' | 1-NUM;2-'(';4-of;5-CONJ;5-to;6-',';8-this |
| 4-of | 0-KEY;1-NUM;7-det;9-EXT;9-CTEXT |
| 5-CONJ | 0-KEY;1-NUM;2-'(' |
| 6-',' | 0-KEY;1-NUM;2-'(';5-CONJ |
| 7-det | 1-NUM;9-EXT;9-CTEXT;9-act |
| 8-this | 0-KEY |
| 9-EXT | 9-EXT;9-OF;14-'(';9-CTEXT;9-CONJ;9-act;15-NUM;15-'-' |
| 10-to | 0-KEY;1-NUM;2-'(';7-det;9-EXT;9-CTEXT;8-this |
| 11 | not used |
| 12-act | 12-act;16-'(';15-NUM;12-CONJ;12-of |
| 13-'(' | 1-')';13-{any other word type} |
| 14-'(' | 9-')';14-{any other word type} |
| 15-NUM | 15-NUM;0-KEY;12-of;12-act;15-'-';15-EXT |
| 16-'(' | 12-')';16-{any other word type} |

Starting from such a KEY word, subsequent WORDS (defined above) are read until there is no next state in the Table 3 above. In other words, the WORDs in the sequence following a KEY, REF or EXT are each read by the program, and when a WORD which is not covered by the state transition table of Table 2 is encountered, and end of reference (EOR) tag is placed on the last word in the sequence.

There may be more than one reference in a paragraph. Using the above rules, the different reference patterns in a given paragraph are extracted and tagged separately, in turn.

V—Generation of Standard Form Cross-References from Reference Patterns

A phrase such as

"Paragraphs 1, 2 and 4 of Part I and 3(a) and (c) of Part II of Schedule 6" should now have been identified using the techniques described in IV above. A phrase in this form is, however, still ambiguous and must be converted into a form which can be understood before cross-references can be hyperlinked to the appropriate paragraph/section.

To do this, the various parts (WORDS) of a given phrase are first labelled according to their generic family. For example, KEY words may be given upper case alphabetical labels, with P="Paragraph";

Q="Part";

S="Schedule".

Similarly, different numbering styles may be given different lower case alphabetical character labels. For example:

x=NUMBER (as previously defined)

y=RN (as previously defined)

z=SA (as previously defined).

On this basis, the above example can be rewritten as

"$Px_1$, $x_2$ and $X_3$ of $Qy_1$ and $x_4$ $z_1$ of $QY_2$ of $Sx_5$"

where $x_1=1$ $x_2=2$ $x_3=4$ $x_4=3$ $x_5=6$ $y_1=I$ $y_2=II$ $z_1=a$ $x_2=c$.

One common source of ambiguity is the word "to". Depending upon context, "to" may mean "of" or "and", e.g.:

"Appendix 6 to Schedule 3"=Appendix 6 *of* Schedule 3 but "Sections 4 to 8 inclusive"=Sections 4 *and* 8.

Thus, a further set of rules applied in sequence is needed. These are set out below in Table 4:

TABLE 4

| Rule No: | Rule: |
| --- | --- |
| (1) | "x" →x (singleton) |
| (2) | "xyz" → (xyz) |
|  | [Groups are formed, reading from left to right] |
| (3) | "x to y" → &(x,y) |
|  | [The word "to" is interpreted as a Boolean AND.] |
| (4) | "x and y" → &(x,y) |
| (5) | "x or y" → &(x,y) |
| (6) | "(x $y_1$ $z_1$) and ($y_2$ $z_2$)" |
|  | or "(x $y_1$ $z_1$) or ($y_2$ $z_2$)" } → x($y_1$ $z_1$, $y_2$ $z_2$) |
|  | or "(x $y_1$ $z_1$) to ($y_2$ $z_2$)" |

[The program assumes that x refers to <u>both</u> parts that are separated by "and", "or" or "to"—for example "3(a)(i) and c(ii)" is interpreted as "3a(i) and 3c(ii)"]

(7)

"(x y) and/or/to (rs)"→&((x y), (rs))

[If the first WORD in the first part is not also found in the second part after the PREPOSITION/CONJUNCTION, then it is assumed that the two parts are separate. For example: "3(a) and II(i)" are not understood as "3(a) and 3(II(i))"]

(8)

"$x_1$, $x_2$, &($x_3$, $y_3$)"→& ($x_1$, $x_2$, $x_3$, $x_4$)

[This rule governs lists]

(9)

"&($x_1$, $x_2$) and $x_3$→& ($x_1$, $x_2$, $x_3$)

(10)

"Px →P(x)"

[Formation of prefix groups]

(11)

"P(x $y_1$ $y_2$) and/or/to P($y_2$ $z_2$)"→P(x($y_1$ $z_1$, $y_2$ $z_2$))

[The document outline defines when Q is subordinate to P]

(13)

"P(x) Q(y) R(z) and Q(r) T(s)"→P(x) Q(yR(z), rT(s))

(14)

"x of Q"

→Qx

"x to Q"

(15)

"P of Q"

→QP

"P to Q"

(16)

"PQ of R"

→RPQ

PQ to R"

(17)

"PE"→E:P

[E is an external reference]

The following structures are implied by the nomenclature employed above:

(x y z) is a tree structure: x
|-y
|-z x(a,b) is a branch structure: x
|-a
|-b

Thus, for example, (P(x) Q(y(R(z), rT(s)) represents:

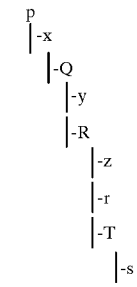

The rules are applied cyclically until only one root remains.

EXAMPLE 1

As an example, the reference pattern "paragraphs 1, 2 and 4 of Part I and 3(a) and (c) of Part II of Schedule 6"→

$x_1$, $x_2$ and $x_3$ of $Qy_1$ and $x_4z_1$, and $z_2$ of $Qy_2$ of $Sx_5$.

Then, from Rule (2)→

$Px_1$, and $x_2$ and $x_3$ of $Qy_1$ and ($x_4z_1$) and $Z_2$ of $Qy_2$ of $Sx_5$ The next applicable rule is Rule (4):

$Px_1$, &($x_2$, $x_3$) of $Qy_1$ and ($x_4$ $z_z$) and $z_2$ of $Qy_2$ of $Sx_5$ Under Rule (6):

$Px_1$, &$(x_2, x_3)$ of $Qy_1$ and $x_4(z_1, z_2)$ of $Qy_2$ of $Sx_5$

Rule (8)

P &$(x_1, x_2, x_3)$ of $Qy_1$ and $x_4(z_1, z_2)$ of $Qy_2$ of $Sx_5$

Rule (10)

$P(x_1, x_2, x_3)$ of $Q(y_1)$ and $x_4(z_1, z_2)$ of $Q(y_2)$ of $S(x_5)$

Rule (14)

$P(x_1, x_2, x_3)$ of $Q(y_1)$ and $Q(y_2)x_4(z_1, z_2)$ of $S(x_5)$

Rule (15)

$Q(y_1)$ $P(x_1, x_2, x_3)$ and $Q(y_2)x_4(z_1, z_2)$ of $S(x_5)$

Rule (16)

$Q(y_1)$ $P(x_1, x_2, x_3)$ and $S(x_5)$ $Q(y_2)$ $x_4(z_1, z_2)$

This expression still contains more than one root so the rules are re-applied from (1) onwards. It will be seen that the applicable rule is Rule (13):

$Q(y_1)$ $P(x_1, x_2, x_3)$ and $S(x_5)$ $Q(y_2)$ $x_4(z_1, z_2)$

→$S(x_5)$ $Q(y_1P(x_1, x_2, x_3)$ , $y_2x_4(z_1, z_2))$

END

The reference tree $S(x_5)Q(y_1P(x_1, x_2, x_3), y_2x_4(z_1, z_2))$ can be traversed to give five link anchors:

$Sx_5.Qy_1.Px_1$ ("Schedule 6.Part I.Paragraph 1")

$Sx_5.Qy_1.Px_2$ ("Schedule 6.Part I.Paragraph 2")

$Sx_5.Qy_1.Px_3$ ("Schedule 6.Part I.Paragraph 4")

$Sx_5.Qy_2.Px_4.z_1$ ("Schedule 6.Part II.Paragraph 3.a")

$Sx_5.Qy_2.Px_4.z_2$ ("Schedule 6.Part II.Paragraph 3.c")

It will be noted that, if $y_1$ were of type x, then ambiguity would exist, for which see below.

EXAMPLE 2

"Clauses 6 or 7 of Annexes A, B and C"

→"Cx $_1$ or $x_2$ of $Ay_1$, $y_2$ and $y_3$"

→"$Cx_1$ or $x_2$ of $Ay_1$, &$(y_2, y_3)$ (Rule 4)

→"C& $(x_1, x_2)$ of $Ay_1$, &$(y_2, y_3)$ (Rule 5)

→"C& $(x_1, x_2)$ of A&$(y_1, y_2, y_3)$ (Rule 8)

→"$C(x_1, x_2)$ of $A(y_1, y_2, y_3)$ (Rule 10)

→$A(y_1, y_2, y_3)$ C $(x_1, x_2)$ (Rule 15)

This may again be traversed to produce the 6 link anchors:

$Ay_1.Cx_1$ (AnnexA.Clause6)

$Ay_1.Cx_2$ (AnnexA.Clause7)

$Ay_2.Cx_1$ (AnnexB.Clause6)

$Ay_2.Cx_2$ (AnnexB.Clause7)

$Ay_3.Cx_1$ (AnnexC.Clause6)

$Ay_3.Cx_2$ (AnnexC.Clause7)

The outline file previously generated, which sets global rules for interpretation and minimizes ambiguities, is consulted to help identify local references in attachments and references elsewhere within the document. As will be seen from the outline file, the reference phrase "paragraph 7", when encountered in a paragraph in Appendix A, will be assigned the full address ".ApxA.7" provided that the entry "appendix.paragraph" is contained within the outline file.

By default, the address locality is prefixed.

VI—Recognition of Defined Terms and the Creation of Destination Anchors for Them In addition to the generation of links between section headings and references to them in the text, the program can also insert links between defined terms and their definitions.

Any group of words enclosed in double quotes or mixed 66 99 style quotes is treated as a defined term. Its position in the file is recorded so that matching word groups in the text can be associated with it and links inserted.

If the input text contains a mistake and only has an unpaired quote then a limit of ten consecutive words is taken as the quoted term and the term is ignored. Quoted terms are not allowed over paragraph boundaries. Further, the program does not look for definitions in recognized cross-reference phrases. The position in the text of the defined terms is found and link anchors are inserted between them and the definitions (Box 56 in FIG. 3).

Furthermore, automatic links may be established between a term considered to be undefined in the text, and a table of such undefined terms: Terms are usually characterised in contracts and agreements by words with initial capitalisation or all capitals. Where single capitalised words not at the beginning of a sentence or two or more capitalised words in sequence are found and not being a defined term then they are classified as an undefined term. A table of such terms is generated, and links are established between that table (which may either be a separate document or may be appended to the document being read) and the undefined term located.

VII—Collation of References with Paragraph Numbers

Figure 6:
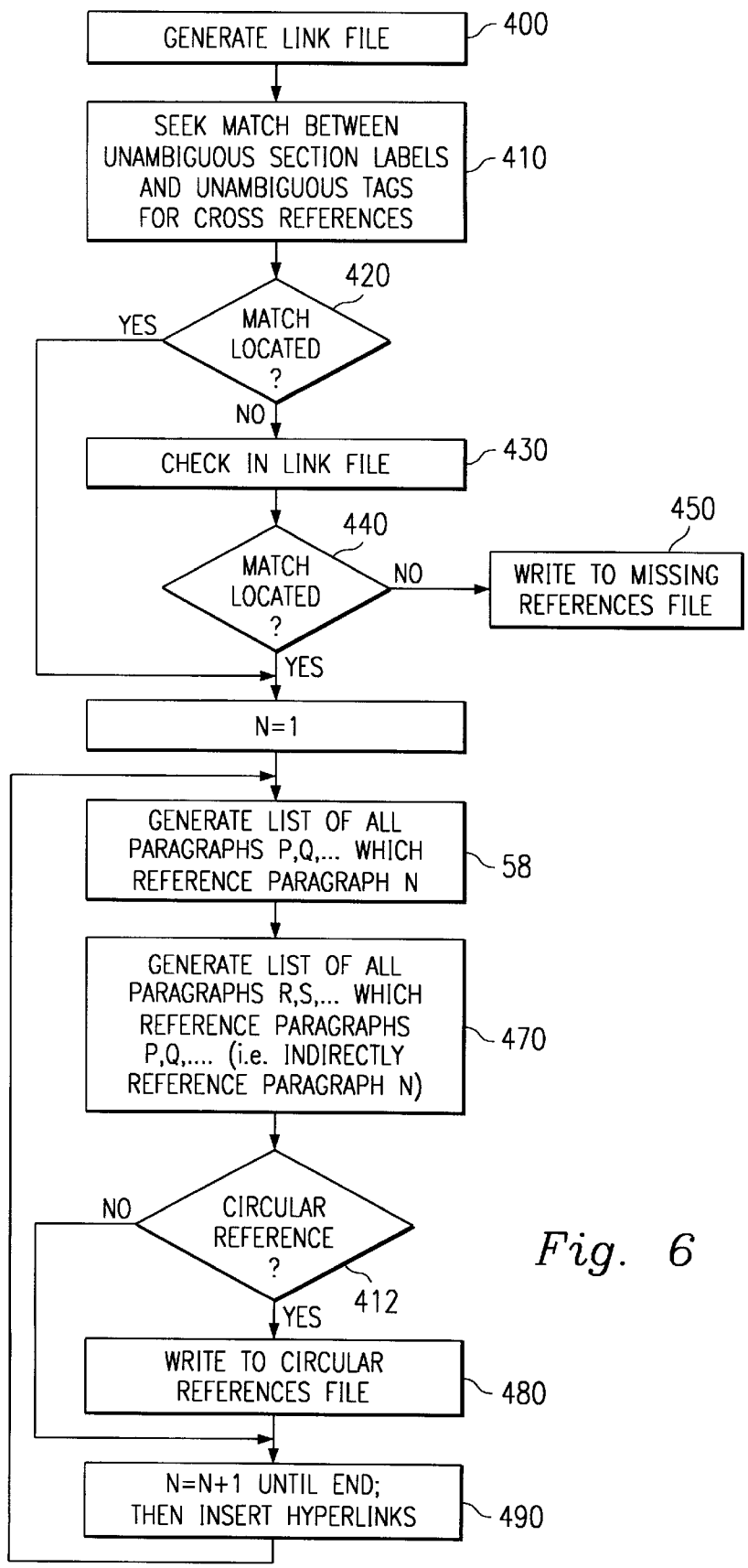
FIG. 6 shows a flow diagram of a third part of the data processing method of FIG. 3.

This procedure is shown in the form of a flow diagram in FIG. 6 with steps 58 and 400–490. Once the whole HTML input file has been read, the reference addresses (tags) are collated with the section/paragraph tags (step 410). Some of the reference tags may not match the section/paragraph tags (step 420), and if so, they are compared with a list of entries in a "link database". This is a file containing associations between named anchors in the processed document and URLs to anchors elsewhere or also in the processed document. It can be provided before processing commences (at step 400) of FIG. 6 so that external links can be made on the first processing of the document or with a post-processing step.

The link database typically has a file format

;comment
NAME URL
NAME URL NEWLINKTEXT
NAME !

Where NAME is the paragraph anchor name, URL is a known uniform resource location (e.g. an external Internet address) and NEWLINKTEXT is (if specified), alternative text to replace text before the </A> HTML tag. If "!" is specified, then the link is ignored.

Any references which are still unmatched (step 440) are written to a missing links file (step 450) and also to a connections file for post processing by another program. All external references are written to a separate external file as well as to this connections file.

Next, a list of all the paragraphs which reference a given paragraph is collated (step 58, again also referring to FIG. 3). In the following example, numbers between < and > are the paragraph anchor labels obtained as set out in II and III above:

<3.1>(3.1) Heading
   [Text]
<3.2>(3.2) Heading
   [Text . . . "as defined in <3.1>3.1 above" . . . ]

```
<4.6.a.i>4.6(a)(i) Heading
    [Text ... "further details in 3.1 are ... "]
```

Appendix A

```
<Apx.A.II.C>PartII(c) Heading
    [Text ... "the definitions in Section 4.6(a)(i) of the
        main body ... "]
```
would cause the following table to be generated:

TABLE 5

| Paragraph Anchor Label | Paragraph Anchor Label of those paragraphs referencing Col. 1 | Paragraph Anchor Label of those paragraphs referencing Col. 2 (indirect references) |
|---|---|---|
| ... | ... | ... |
| 3.1 | 3.2 | ApxA.II.c |
|  | 4.6.a.i |  |
| 3.2 | NONE | NONE |
| 3.3 | 1.4 | NONE |
|  | ApxA.i |  |
| ... | ... | ... |

The dependencies tree set out in Table 5 is written to a further file, with the indirect references (see Table 5, column 3 and step 470 of FIG. 6) also listed. To save file space, paragraphs that are not referenced elsewhere are preferably not listed. To address problems of circularity (that is, where clause A, for example, uses clause B as a definition and clause B then uses clause A as a definition), a list of such circular clauses is also output (step 480).

VIII—Insertion of Link HTML Tags

The paragraphs/sections have been identified and named as explained in I, II and III above, and the cross-references have been identified and tagged as explained in IV and V. Having generated the various information files as set out in VII, the positions of the start and end of the reference phrases and term definitions (VI above) and use are recorded. When the output file is written the appropriate HTML anchors are written at those positions (step 490).

The paragraph address is written on a line before the original text. It forms a hyperlink to the contents list of the document. Also on this line is a list of links to clauses which reference this clause (backward dependent references).

The cross-reference links are written after the reference phrase. This is rather than using the phrase as the text of the link itself because the phrase can refer to multiple references. For example, using the text of the phrase "sections 5 and 7(b)" as the link would be inappropriate as there are two targets. Instead the text will be augmented to read "sections 5 and 7b [5] [7.b]" with the "[5]" and "[7.b]" forming the text of two separate hyperlinks.

Finally, once the text has been marked up, an index file (FIG. 2) is generated. This holds the (optional) table of contents, as well as any diagnostic information obtained during the processing of the original (input) HTML file. The index file is preferably linked to the original HTML file, as well as to other utility programs such as a spell checker/thesaurus, a search tool and to the other generated files containing the list of missing references, external references, term definitions, undefined terms and circular references.

Depending upon how the output file format 60 (FIGS. 2 and 3) has been defined by the user, the output file 60 may either consist of one file or a plurality of separate files numbered sequentially, e.g. "part1.htm", "part2.htm" etc. Each separate file relates to a corresponding top level section of the contract, for example.

The purpose of producing an output file 60 with a list of references which are not linked to a known paragraph anchor name either in the main document or to external publications is to allow the user to edit this file. This allows associations between unconnected links and their actual URLs to be defined. The user can also delete output files and list files found in error in the document.

The format of the missing references file is typically:

```
;comment
NAME URL ;anchor NAME href replaced with URL,
    anchor text unchanged
NAME URL NEWLINKTEXT ;anchor NAME href
    replaced with URL, anchor text replaced with
    NEWLINKTEXT
NAME URL NEWLINKTEXT* ;anchor NAME href
    replaced with URL, anchor text replaced with
    NEWLINKTEXT, entry in missing or external files
    removed
NAME URL* ;anchor NAME href replaced with URL,
    anchor text unchanged, entry in missing or external
    files removed
NAME ! ;anchor text removed, NAME entry in missing
    or external files removed
```

Note that there should be no spaces in the URL and NEWLINKTEXT strings.

The program can be re-run, at which point manual URL amendments are read (at 510, see FIG. 3). Thus, a new set of output files is generated, which files have the corrected links. Entries in the "missing links" an "external" files (see VII) are automatically removed if the "*" or "!" codes are specified.

Although the foregoing has described a technique for linking cross-references to section headings, or defined terms to their definition, within a single document, it will be understood that the technique is equally applicable to a suite of documents located upon the same computer 10, or indeed to a suite of documents located across a Local Area Network (a LAN), or a wide area network (a WAN) including the Internet 70. The anchor labels have a further hierarchy of labelling in such a case, to identify which of the suite of documents is being referred to. For example, an anchor label may read "Doc:6.3.a.i" or "Doc3:ApxA.7.3". Note that a colon separator is used between the document identifier tag (Doc 1 and Doc 3 in this example) and the intra-document reference tags. This allows the program to associate a remote file with the label "Doc 1", for example, then if present, look in a separate anchor index file to find the actual file in which that section (6.3.a.i) will be found. Whenever a contract, for example, is processed, an anchor index file is generated containing the section number link anchor and the name of the file it was found in, so that other contracts can be linked to it.

Whilst the foregoing has been described in terms of HTML, it will be understood that the method could be applied to word processor files in any format. Preferably, input word processor files in other formats would be pre-processed into HTML format to facilitate cross-referencing, but this is not essential. Furthermore, the skilled reader will understand that the techniques disclosed for linking sections within the same document can readily be extended to two or more documents at different locations on a local area network or even documents at different locations across a wide area network. The scope of invention is therefore to be limited only by the following claims.

What is claimed is:

1. A computer readable medium for storing a computer executable software program for cross-referencing text within a document, the program including instructions for:

locating a plurality of label strings within said document, each label string labelling an associated part of said document;

converting each said located label string into a standard format such that the said associated parts of said document are each unambiguously labelled by said standard format;

locating a plurality of cross-reference strings within said document, said cross-reference strings referring to parts of said document labelled by said label strings;

converting each said cross-reference string into said standard format such that said converted cross-reference strings refer unambiguously to one or more labelled parts of said document;

collating said standard format cross-reference strings with said standard format label strings; and providing a program link between said cross-reference strings and those labelled parts of said document to which the cross-reference strings refer.

2. The medium of claim 1 further including instructions in which each label string comprises one or more characters defining a heading within said document.

3. The medium of claim 2 further including instructions in which said standard format comprises information labelling each paragraph within said document using all terms in a heading hierarchy necessary uniquely to label each paragraph.

4. The medium of claim 1, wherein the instructions for locating the label strings within said document further comprises dividing said document into a plurality of constituent paragraphs by locating end of paragraph formatting information within said document.

5. The medium of claim 4, said medium further including instructions for parsing the document into a plurality of predetermined word types.

6. The medium of claim 5 further including instructions for seeking the label strings the label strings only in a first predetermined number of words within each paragraph.

7. The medium of claim 6 further including instructions in which the word type is selected from the group consisting of alpha text, a number, a space, a punctuation mark, a hypertext markup language formatting command, an indent, an ampersand (&), a quotation mark, a character forming part of a program directive, and a string of text to be ignored while locating label strings.

8. The medium of claim 7 further including instructions for disregarding any word types classified as a hypertext markup language formatting command when locating label strings.

9. The medium of claim 7 further including instructions for disregarding any word types classified as a space when locating label strings.

10. The medium of claim 7 further including instructions for further parsing any alpha text words into a plurality of word type sub-groups.

11. The medium of claim 10 further including instructions for selecting said word type subgroup from the group consisting of an alpha text word having an initial capital letter, a roman numeral, and a string of alpha text having only one character therein.

12. The medium of claim 1 further including instructions for locating cross-reference strings within said document further comprises parsing the document into a plurality of predetermined word types.

13. The medium of claim 12 further including instructions for selecting said word type from the group consisting of alpha text, a number, a space, a punctuation mark, an hypertext markup language formatting command, an indent, an ampersand (&) character, a quotation mark, a character forming part of a program directive, and a string of text to be ignored while locating cross-reference strings.

14. The medium of claim 13, further including instructions for reclassifying any words determined to be of the alpha text type into a word type subgroup selected from the group consisting of a keyword, a conjunction, and a preposition.

15. The medium of claim 14 further including instructions in which the keyword word-type sub-group comprises the words "clause", "paragraph", "section", "article", "schedule", "appendix", "annex", "table", "note", "part", "Chapter", "sub-section", "subparagraph", "subclause", "exhibit", "directive", "condition", and "attachment".

16. The medium of claim 1 further including instructions where locating cross-reference strings within said document further includes identifying the end of each said cross-reference string with a finite state machine.

17. The medium of claim 16 further including instructions in which the finite state machine has a state transition table.

18. The medium of claim 1 further including instructions for generating a list of converted label strings;

generating a list of converted cross-reference strings; and compiling a table of converted cross-reference strings with reference to the labelled parts of the document in which the said cross-reference strings appear.

19. The medium of claim 18 further including instructions for generating a further list of converted cross-reference strings which do not refer to any of the parts of the document labelled by a converted label string.

20. The medium of claim 19 further including instructions for generating a database of database strings defining a plurality of external addresses;

matching those converted cross-reference strings within said further list with corresponding strings within said database; and linking said cross-reference strings with the addresses of said corresponding strings within said database.

21. The medium of claim 20 further including instructions in which said external addresses comprise Uniform Resource Locations (URLs).

22. The medium of claim 21 further including instructions wherein said URLs are selected from a group comprising a local area network (LAN), a wide area network (WAN) and an Internet address.

23. The medium of claim 21 further including instructions for generating a list of each converted cross-reference string which neither refers to any of the parts of the document labelled by a converted label string, nor refers to a database string defining an external address;

said list being indicative of incorrect cross-references.

24. The medium of claim 1 further including instructions for inserting hypertext markup language code for tagging each said located label string with said converted label string; and inserting hypertext markup language code adjacent each said located cross-reference string such that each said cross-reference points to a corresponding tagged label string, whereby a hypertext link is created between the cross-reference and the part of said document to which it refers.

25. A computer readable medium for storing a computer executable software program for cross-referencing text within a plurality of documents, the program including instructions for:

locating a plurality of label strings within each said document, each label string labelling an associated part of each said document;

converting each said located label string into standard format such that the said associated parts of each said document are all unambiguously labelled by said standard format;

locating a plurality of cross-reference strings within said documents, said cross-reference strings referring to parts of said documents labelled by said label strings;

converting each said cross-reference string into said standard format such that said converted cross-reference strings refer unambiguously to one or more labelled parts of said documents;

collating said standard format cross-reference strings with said standard format label strings; and providing a program link between said cross-reference strings and those labelled parts of each said document to which the cross-reference strings refer, whereby a cross-reference string may be linked to a label string within a same one of the plurality of documents or to a label string within another of the plurality of documents.

26. A computer system for cross-referencing text within a document, said system comprising a computer having:

means for locating label strings within said document, each label string labelling an associated part of said document;

means for converting each said located label string into standard format such that the said associated parts of said document are each unambiguously labelled by said standard format;

means for locating cross-reference strings within said document, said cross-reference strings referring to parts of said document labelled by said label strings;

means for converting each said cross-reference string into said standard format such that said converted cross-reference strings refer unambiguously to one or more labelled parts of said document;

means for collating said standard format cross-reference strings with said standard format label strings; and means for providing a program link between said cross-reference strings with those labelled parts of said document to which they refer.

\* \* \* \* \*